United States Patent
Awoniyi-Oteri et al.

(10) Patent No.: US 11,405,288 B2
(45) Date of Patent: Aug. 2, 2022

(54) DYNAMIC PHYSICAL DOWNLINK CONTROL CHANNEL SKIPPING INDICATION

(71) Applicant: QUALCOMM Incorporated, San Diego, CA (US)

(72) Inventors: Olufunmilola Omolade Awoniyi-Oteri, San Diego, CA (US); Wooseok Nam, San Diego, CA (US); Tao Luo, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,792

(22) Filed: Aug. 17, 2020

(65) Prior Publication Data

US 2021/0058304 A1    Feb. 25, 2021

Related U.S. Application Data

(60) Provisional application No. 62/890,425, filed on Aug. 22, 2019.

(51) Int. Cl.
*H04L 43/02* (2022.01)
*H04W 72/14* (2009.01)
(Continued)

(52) U.S. Cl.
CPC ......... *H04L 43/02* (2013.01); *H04W 72/1278* (2013.01); *H04W 72/14* (2013.01); *H04W 88/02* (2013.01)

(58) Field of Classification Search
None
See application file for complete search history.

(56) References Cited

U.S. PATENT DOCUMENTS

2013/0242729 A1* 9/2013 Chen .................. H04L 1/0051
                                                     370/230
2016/0294531 A1* 10/2016 Loehr ............... H04W 72/0413
(Continued)

OTHER PUBLICATIONS

Catt: "PDCCH Skipping", 3GPP Draft, R1-1908608, 3GPP TSG RAN WG1 Meeting #98, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765216, 5 Pages, Retrieved from the Internet: URL:http://www.3gpp.org/ftp/tsg_ran/WG1_RL1/TSGR1_98/Docs/R1-1908608.zip [retrieved on Aug. 17, 2019] Figures 1, 2 p. 1, Paragraph 2—p. 2, Paragraph 2.1 p. 3, Paragraph 2.2—p. 4.
(Continued)

*Primary Examiner* — Nicholas Sloms
(74) *Attorney, Agent, or Firm* — Harrity & Harrity, LLP; Kevin M. Donnelly

(57) ABSTRACT

Various aspects of the present disclosure generally relate to wireless communication. In some aspects, a UE may receive a PDCCH including an indication to skip PDCCH monitoring during at least one of: a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH. The UE may skip PDCCH monitoring based at least in part on the indication. Numerous other aspects are provided.

29 Claims, 11 Drawing Sheets

515
Skip PDCCH monitoring during period(s) of time based at least in part on indication

505
Determine UE to skip PDCCH monitoring during period(s) of time

510
PDCCH including indication to skip PDCCH monitoring during period(s) of time

(51) Int. Cl.
*H04W 72/12* (2009.01)
*H04W 88/02* (2009.01)

(56) References Cited

U.S. PATENT DOCUMENTS

| | | | |
|---|---|---|---|
| 2017/0303192 A1* | 10/2017 | Sun | H04W 52/0206 |
| 2018/0054291 A1* | 2/2018 | Yi | H04W 76/27 |
| 2019/0268971 A1* | 8/2019 | Talarico | H04W 88/06 |
| 2019/0313380 A1* | 10/2019 | Ye | H04W 24/00 |
| 2020/0092073 A1* | 3/2020 | Papasakellariou | H04L 5/0053 |
| 2020/0120701 A1* | 4/2020 | Peng | H04W 72/042 |
| 2020/0314748 A1* | 10/2020 | Kim | H04W 74/006 |
| 2021/0051686 A1* | 2/2021 | Liu | H04W 72/0453 |
| 2021/0168715 A1* | 6/2021 | Huang | H04W 72/042 |
| 2021/0176762 A1* | 6/2021 | Islam | H04B 7/0626 |
| 2021/0266841 A1* | 8/2021 | Li | H04W 52/0235 |

OTHER PUBLICATIONS

Huawei, et al., "Reduction of PDCCH Monitoring for UE Power Saving," 3GPP Draft, 3GPP TSG RAN WG1 Meeting #97, R1-1906592, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728043, 7 pages, Retrieved from the Internet: URL: http://www.3gpp.org/ftp/Meetings%5F3GPP%5FSYNC/RAN1/Docs/R1%2D1906592%2Ezip [retrieved on May 13, 2019] the whole document.

International Search Report and Written Opinion—PCT/US2020/070428—ISA/EPO—dated Oct. 19, 2020.

Qualcomm Incorporated: "UE Adaptation to the Traffic and UE Power Consumption Characteristics", 3GPP Draft, 3GPP TSG-RAN WG1 Ad-Hoc Meeting 1901, R1-1900911 UE Adaptation for Power Saving, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593757, pp. 1-24 Retrieved from the Internet: URL: http://www.3gpp.org/ftp/tsg%5Fran/WG1%5FRL1/TSGR1%5FAH/NR%5FAH%5F1901/Docs/R1%2D1900911%2Ezip, [retrieved on Jan. 20, 2019], Chapters 1. 2.

ZTE: "Discussion on Potential Techniques for UE Power Saving", 3GPP Draft, R1-1905047, 3GPP TSG RAN WG1 #96bis , Discussion on potential Techniques for UE Power Saving-Final, 3rd Generation Partnership Project (3GPP), Mobile Competence Centre, 650, Route Des Lucioles, F-06921, Sophia-Anti, vol. RAN WG1, No. Xi'an, China, Apr. 8, 2019-Apr. 12, 2019, Apr. 3, 2019 (Apr. 3, 2019), XP051707374, pp. 1-4, Retrieved from the Internet: URL:http://www.3gpp.org/ftp/tsg%5Fran/WG1%5FRL1/TSGR1%5F96b/Docs/R1%2D1905047%2Ezip [retrieved on Apr. 3, 2019] Figure 3, p. 3, Paragraph 2.4, p. 4, Paragraph 3.

* cited by examiner

DYNAMIC PHYSICAL DOWNLINK CONTROL CHANNEL SKIPPING INDICATION

CROSS-REFERENCE TO RELATED APPLICATION

This Patent Application claims priority to U.S. Provisional Patent Application No. 62/890,425, filed on Aug. 22, 2019, entitled "DYNAMIC PHYSICAL DOWNLINK CONTROL CHANNEL SKIPPING INDICATION," and assigned to the assignee hereof. The disclosure of the prior Applications is considered part of and is incorporated by reference into this Patent Application.

FIELD OF THE DISCLOSURE

Aspects of the present disclosure generally relate to wireless communication, and more specifically, to techniques and apparatuses for a dynamic physical downlink control channel (PDCCH) skipping indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

Physical downlink control channel (PDCCH) skipping is a technique for providing power savings at a user equipment (UE). PDCCH skipping occurs when a UE skips PDCCH monitoring during a period of time (for example, one or more slots) during which the UE would otherwise monitor for a PDCCH. Here, by skipping PDCCH monitoring during the period of time, battery power is conserved at the UE (for example, because the UE does not monitor for PDCCH). In the presence of aperiodic or relatively irregular traffic, dynamic (that is, non-static, non-semi-persistent) PDCCH skipping is desirable in order to better control performance of PDCCH skipping by the UE.

SUMMARY

In some aspects, a method of wireless communication, performed by a user equipment (UE), may include receiving a physical downlink control channel (PDCCH) including an indication to skip PDCCH monitoring during at least one of a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, and skipping PDCCH monitoring based at least in part on the indication.

In some aspects, a method of wireless communication, performed by a base station, may include determining that a UE is to skip PDCCH monitoring during at least one of a period of time between a PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, and transmitting the PDCCH including an indication that the UE is to skip PDCCH monitoring based at least in part on the determination.

In some aspects, a UE for wireless communication may include memory and one or more processors operatively coupled to the memory. The memory and the one or more processors may be configured to receive a PDCCH including an indication to skip PDCCH monitoring during at least one of a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, and skip PDCCH monitoring based at least in part on the indication.

In some aspects, a base station for wireless communication may include memory and one or more processors operatively coupled to the memory. The memory and the one or more processors may be configured to determine that a UE is to skip PDCCH monitoring during at least one of a period of time between a PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, and transmit the PDCCH including an indication that the UE is to skip PDCCH monitoring based at least in part on the determination.

In some aspects, a non-transitory computer-readable medium may store one or more instructions for wireless communication. The one or more instructions, when executed by one or more processors of a UE, may cause the one or more processors to: receive a PDCCH including an indication to skip PDCCH monitoring during at least one of a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, and skip PDCCH monitoring based at least in part on the indication.

In some aspects, a non-transitory computer-readable medium may store one or more instructions for wireless communication. The one or more instructions, when executed by one or more processors of a base station, may cause the one or more processors to: determine that a UE is to skip PDCCH monitoring during at least one of a period of time between a PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, and transmit the PDCCH including an indication that the UE is to skip PDCCH monitoring based at least in part on the determination.

In some aspects, an apparatus for wireless communication may include means for receiving a PDCCH including an indication to skip PDCCH monitoring during at least one of a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, and means for skipping PDCCH monitoring based at least in part on the indication.

In some aspects, an apparatus for wireless communication may include means for determining that a UE is to skip PDCCH monitoring during at least one of a period of time between a PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, and means for transmitting the PDCCH including an indication that the UE is to skip PDCCH monitoring based at least in part on the determination.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
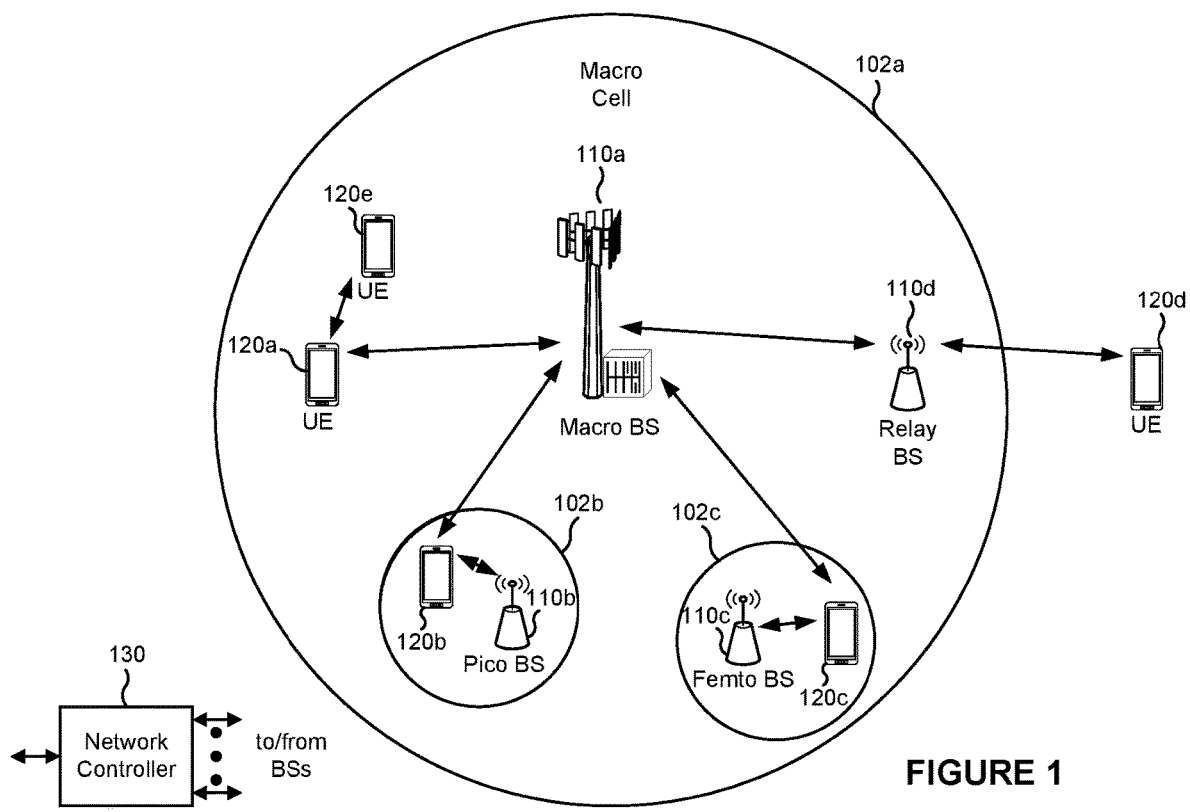
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

In some wireless communication systems, physical downlink control channel (PDCCH) skipping may be implemented as a technique for providing power savings at a user equipment (UE). PDCCH skipping occurs when a UE skips PDCCH monitoring during a period of time (for example, one or more slots) during which the UE would otherwise monitor for a PDCCH. Here, by skipping PDCCH monitoring during the period of time, battery power is conserved at the UE (for example, because the UE does not monitor for PDCCH).

Dynamic (that is, non-static, non-semi-persistent) PDCCH skipping is desirable for implementing PDCCH skipping in the presence of aperiodic or relatively irregular traffic. Some aspects described herein provide techniques and apparatuses for a dynamic PDCCH skipping indication with minimal signaling overhead. In some aspects, as described in further detail below, a UE may receive a PDCCH including an indication to skip PDCCH monitoring during at least one of: a period of time between the PDCCH and a first physical channel scheduled by the PDCCH (for example, a physical downlink shared channel (PDSCH)), a period of time between the first physical channel scheduled by the PDCCH and a second physical channel scheduled by the PDCCH (for example, a physical uplink control channel (PUCCH)), or a period of time between the PDCCH and a third physical channel scheduled by the PDCCH (for example, a physical uplink shared channel (PUSCH). The UE may then skip PDCCH monitoring based at least in part on the indication.

Particular aspects of the subject matter described in this disclosure can be implemented to realize one or more of the following potential advantages. In some aspects, the dynamic PDCCH skipping indication described herein requires minimal overhead (for example, 1 bit or 2 bits), thereby minimizing a signaling overhead associated with providing a dynamic PDCCH skipping indication. Further, the dynamic PDCCH skipping indication enables PDCCH skipping to realize UE power savings, even in the presence of aperiodic or relatively irregular traffic.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, a virtual network, or the like, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
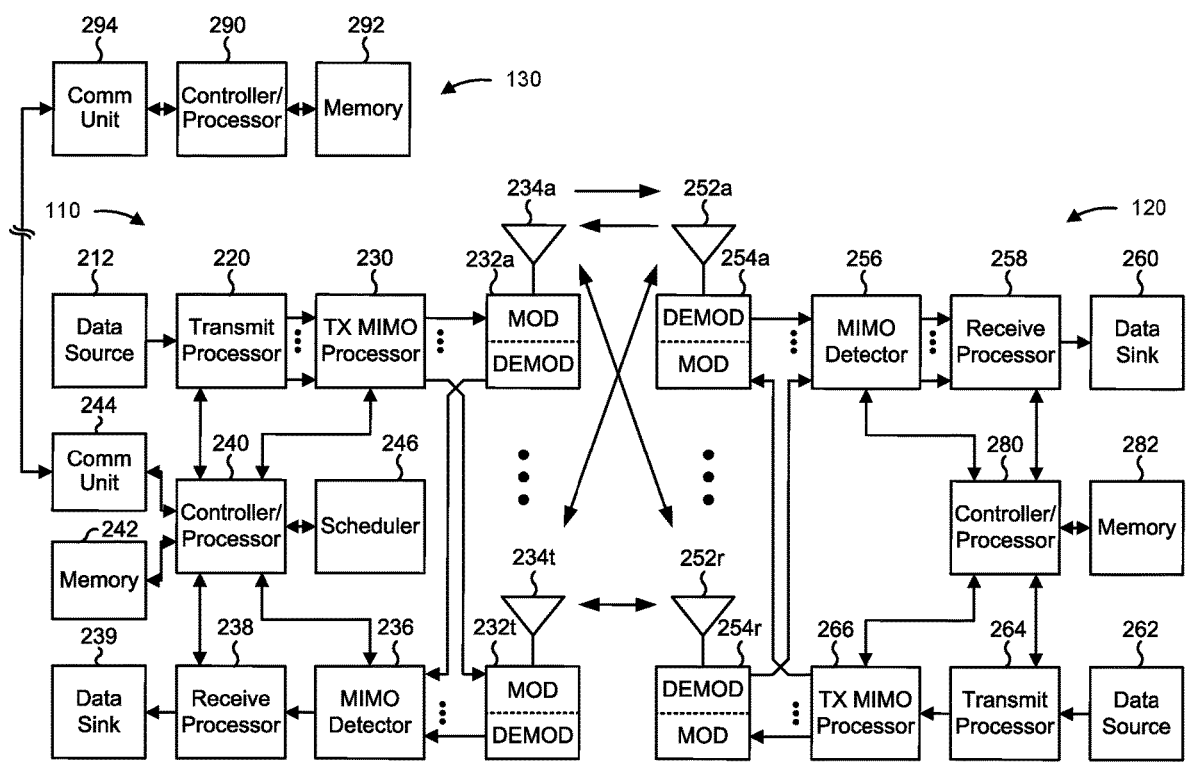
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with a dynamic PDCCH skipping indication, as described in more detail elsewhere herein. For example, controller/processor 240 of base station 110, controller/processor 280 of UE 120, or any other component(s) of FIG. 2 may perform or direct operations of, for example, the process of FIG. 6, the process of FIG. 7, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a PDCCH including an indication to skip PDCCH monitoring during at least one of: a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH; means for skipping PDCCH monitoring based at least in part on the indication; or the like, or combinations thereof. In some aspects, such means may include one or more components of UE 120 described in connection with FIG. 2.

In some aspects, base station 110 may include means for determining that a UE 120 is to skip PDCCH monitoring during at least one of: a period of time between a PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH; means for transmitting the PDCCH including an indication that the UE is to skip PDCCH monitoring based at least in part on the determination; or the like, or combinations thereof. In some aspects, such means may include one or more components of base station 110 described in connection with FIG. 2.

Figure 3:
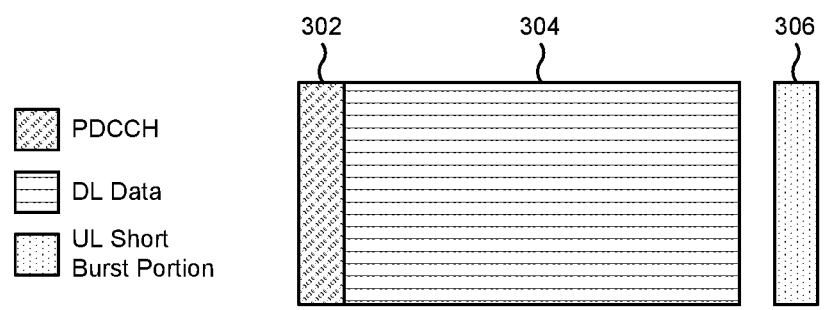
FIG. 3 is a diagram showing an example downlink (DL)-centric slot or communication structure in accordance with various aspects of the present disclosure.

FIG. 3 is a diagram showing an example downlink (DL)-centric slot or communication structure in accordance with various aspects of the present disclosure. The DL-centric slot (or wireless communication structure) may include a control portion 302 during which the scheduling entity (for example, UE or BS) transmits various scheduling information or control information corresponding to various portions of the DL-centric slot to the subordinate entity (for example, UE). The control portion 302 may exist in the initial or beginning portion of the DL-centric slot. In some configurations, the control portion 302 may be a physical DL control channel PDCCH, as indicated in FIG. 3. In some aspects, the control portion 302 may include legacy PDCCH information, shortened PDCCH (sPDCCH) information), a control format indicator (CFI) value (for example, carried on a physical control format indicator channel (PCFICH)), one or more grants (for example, downlink grants, uplink grants, or the like, or combinations thereof), or the like, or combinations thereof.

The DL-centric slot may also include a DL data portion 304 during which the scheduling entity (for example, UE or BS) transmits DL data to the subordinate entity (for example, UE) using communication resources utilized to communicate DL data. The DL data portion 304 may sometimes be referred to as the payload of the DL-centric slot. In some configurations, the DL data portion 304 may be a PDSCH.

The DL-centric slot may also include an UL short burst portion 306 during which the subordinate entity (for example, UE) transmits reference signals or feedback to the scheduling entity (for example, UE or B S) using communication resources utilized to communicate UL data. The UL short burst portion 306 may sometimes be referred to as an UL burst, an UL burst portion, a common UL burst, a short burst, an UL short burst, a common UL short burst, a common UL short burst portion, or various other suitable terms. In some aspects, the UL short burst portion 306 may include one or more reference signals. Additionally or alternatively, the UL short burst portion 306 may include feedback information corresponding to various other portions of the DL-centric slot. For example, the UL short burst portion 306 may include feedback information corresponding to the control portion 302 or the data portion 304. Non-limiting examples of information that may be included in the UL short burst portion 306 include an acknowledgement (ACK) signal (for example, a PUCCH ACK, a PUSCH ACK, or an immediate ACK), a negative acknowledgement (NACK) signal (for example, a PUCCH NACK, a PUSCH NACK, or an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, or various other suitable types of information. The UL short burst portion 306 may include additional or alternative information, such as information pertaining to RACH procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, or various other suitable terms. This separation provides time for the switch-over from DL communication (for example, reception operation by the subordinate entity (for example, BS or UE)) to UL communication (for example, transmission by the subordinate entity (for example, UE)). The foregoing provides some examples of a DL-centric wireless communication structure, but alternative structures having similar features may exist without deviating from the aspects described herein.

Figure 4:
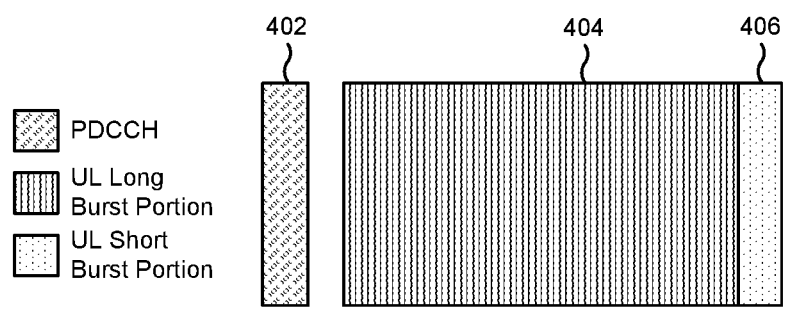
FIG. 4 is a diagram showing an example uplink (UL)-centric slot or communication structure in accordance with various aspects of the present disclosure.

FIG. 4 is a diagram showing an example uplink (UL)-centric slot or communication structure in accordance with various aspects of the present disclosure. The UL-centric slot (or wireless communication structure) may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (for example, UE) to the scheduling entity (for example, UE or BS). In some configurations, the control portion 402 may be a physical DL control channel PDCCH.

As illustrated in FIG. 4, the end of the control portion 402 may be separated in time from the beginning of the UL long burst portion 404. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is merely one example of an UL-centric wireless communication structure, and alternative structures having similar features may exist without deviating from the aspects described herein.

In some circumstances, two or more subordinate entities (for example, UEs) may communicate with each other using sidelink signals. Real-world applications of such sidelink communications may include public safety, proximity services, UE-to-network relaying, V2V communications, Internet of Everything (IoE) communications, IoT communications, mission-critical mesh, or various other suitable applications. Generally, a sidelink signal may refer to a signal communicated from one subordinate entity (for example, UE1) to another subordinate entity (for example, UE2) without relaying that communication through the scheduling entity (for example, UE or BS), even though the scheduling entity may be utilized for scheduling or control purposes. In some aspects, the sidelink signals may be communicated using a licensed spectrum band; in other aspects, the sidelink signals may be communicated using an unlicensed spectrum band.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

In some wireless communication systems, PDCCH skipping may be implemented as a technique for providing power savings at a UE. PDCCH skipping occurs when a UE skips PDCCH monitoring during a period of time (for example, one or more slots) during which the UE would otherwise monitor for a PDCCH. Here, by skipping PDCCH monitoring during the period of time, battery power is conserved at the UE (for example, because the UE does not monitor for PDCCH).

In some cases, a slot format indicator (SFI) configuration can be used as a semi-persistent indication to inform the UE to skip PDCCH monitoring (for example, for certain slots). Such a semi-persistent indication is well-suited for periodic or relatively regular traffic, but is not well-suited for PDCCH skipping in the presence of aperiodic or relatively irregular traffic. Alternatively, a joint adaptation of PDCCH periodicity and minimum scheduling offset can be used to implement PDCCH skipping. However, this approach increases complexity associated with implementing PDCCH skipping and, moreover, is also not well-suited for PDCCH skipping in the presence of aperiodic or relatively irregular traffic.

Therefore, dynamic PDCCH skipping is desirable for implementing PDCCH skipping in the presence of aperiodic or relatively irregular traffic. In some such cases, a downlink control information (DCI) format with one or more fields that allow for identification of number of slots to be skipped during PDCCH monitoring may be used. However, creating and implementing such a DCI format requires an undesirable amount of signaling overhead (for example, because all UEs would have to be configured with the DCI format).

Some aspects described herein provide techniques and apparatuses for a dynamic PDCCH skipping indication with minimal signaling overhead. In some aspects, as described in further detail below, a UE may receive a PDCCH including an indication to skip PDCCH monitoring during at least one of: a period of time between the PDCCH and a first physical channel scheduled by the PDCCH (for example, a PDSCH), a period of time between the first physical channel scheduled by the PDCCH and a second physical channel scheduled by the PDCCH (for example, a PUCCH), or a period of time between the PDCCH and a third physical channel scheduled by the PDCCH (for example, a PUSCH. The UE may then skip PDCCH monitoring based at least in part on the indication.

In some aspects, the dynamic PDCCH skipping indication described herein may be used in a cross-slot scheduling scenario that utilizes one or more scheduling delays. Here, the one or more scheduling delays may be defined by a parameter that identifies a delay between a PDCCH and a PUSCH scheduled by the PDCCH (referred to as a k2 parameter), a parameter that identifies a delay between the PDCCH and a PDSCH scheduled by the PDCCH (referred to as a k0 parameter), or a parameter that identifies a delay between the PDSCH scheduled by the PDCCH and a PUCCH associated with the PDSCH (referred to as a k1 parameter), as described below.

Particular aspects of the subject matter described in this disclosure can be implemented to realize one or more of the following potential advantages. In some aspects, the dynamic PDCCH skipping indication described herein requires minimal overhead (for example, 1 bit or 2 bits), thereby minimizing a signaling overhead associated with providing a dynamic PDCCH skipping indication. Further, the dynamic PDCCH skipping indication enables PDCCH skipping to realize UE power savings, even in the presence of aperiodic or relatively irregular traffic.

Figure 5A:
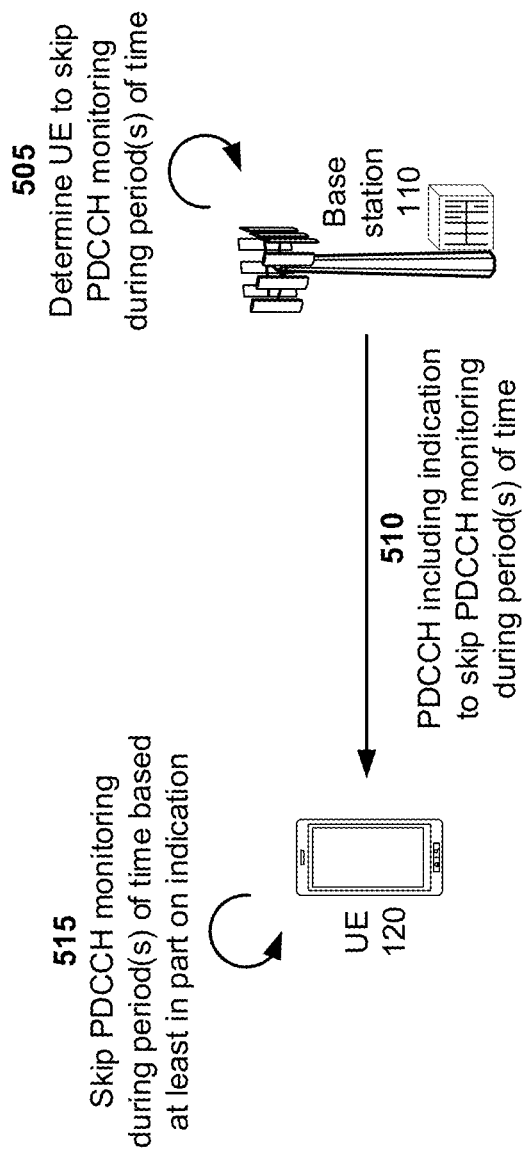
FIGS. 5A-5C are diagrams illustrating examples associated with dynamic physical downlink control channel skipping indication in accordance with various aspects of the present disclosure.
Figure 5B:
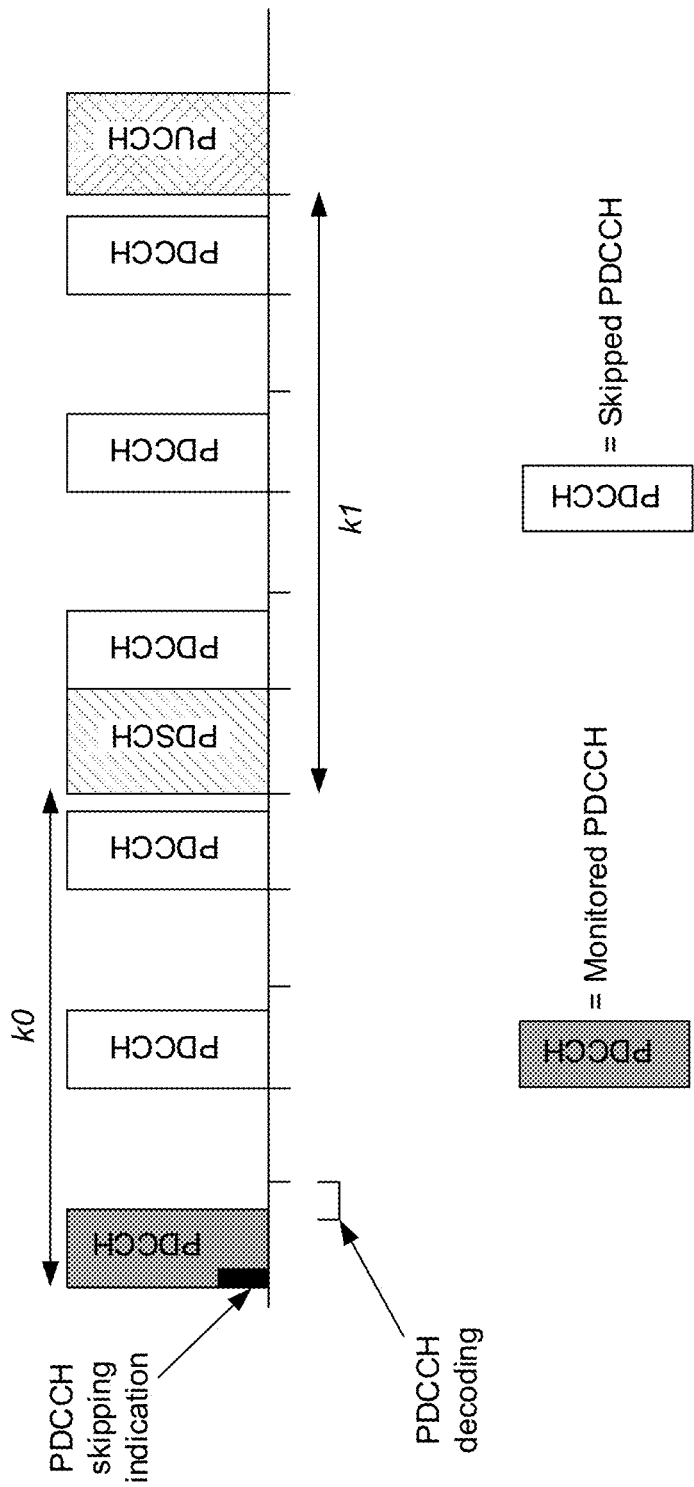
Figure 5C:
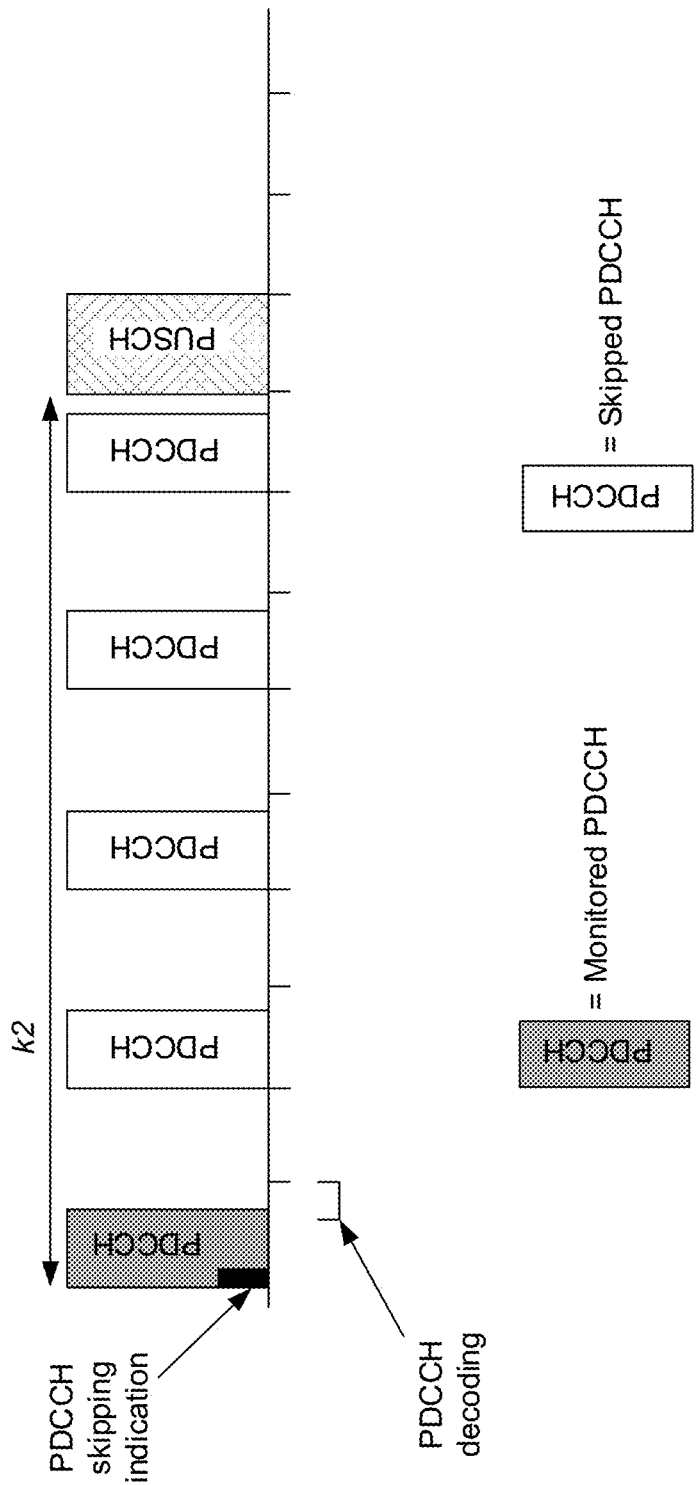

FIGS. 5A-5C are diagrams illustrating examples associated with a dynamic PDCCH skipping indication in accordance with various aspects of the present disclosure.

As shown in FIG. 5A, in a first operation 505, a base station (for example, a base station 110) may determine that a UE (for example, a UE 120) is to skip PDCCH monitoring during one or more periods of time. In some aspects, the one or more periods of time may include a period of time between a PDCCH and a first physical channel scheduled by the PDCCH, such as a PDSCH. Additionally or alternatively, the one or more periods of time may include a period of time between the first physical channel scheduled by the PDCCH (for example, the PDSCH) and a second physical channel scheduled by the PDCCH, such as a PUCCH. Additionally or alternatively, the one or more periods of time may include or a period of time between the PDCCH and a third physical channel scheduled by the PDCCH, such as a PUSCH. Further examples and details regarding the physical channels and the associated one or more periods of time are provided below.

In some aspects, the base station may determine that the UE is to skip PDCCH monitoring during the one or more periods of time based at least in part on scheduling (for example, using scheduler 246) the physical channels to be used for transmitting a communication to the UE (for example, a PDSCH) or receiving a communication from the UE (for example, a PUCCH, a PUSCH). For example, the base station may schedule one or more physical channels using cross-slot scheduling that utilizes one or more scheduling delays (for example, defined by a k0 parameter, a k1 parameter, a k2 parameter, among other possibilities). Here, based at least in part on information associated with the cross-slot scheduling (for example, based at least in part on delays associated with the k0 parameter, the k1 parameter, or the k2 parameter), the base station may determine that the UE is to skip PDCCH monitoring during the one or more periods of time.

In a second operation 510, based at least in part on the determination, the base station may transmit the PDCCH including an indication that the UE is to skip PDCCH monitoring during the one or more periods of time. As indicated in FIG. 5A, the UE may receive the PDCCH including the indication. In some aspects, the indication may be carried in (that is, transmitted by the base station, and received by the UE) DCI included in the PDCCH that schedules the first physical channel, the second physical channel, or the third physical channel.

As further shown, in a third operation 515, the UE may skip PDCCH monitoring based at least in part on the indication. In other words, the UE may skip PDCCH monitoring during the one or more periods of time indicated by the indication.

In some aspects, the indication is a one bit indication and, therefore, may be carried in a single bit in the PDCCH. As an example, the first physical channel scheduled by the PDCCH may be a PDSCH, the second physical channel scheduled by the PDCCH may be a PUCCH, and the third physical channel scheduled by the PDCCH may be a PUSCH. Here, the one bit indication may indicate that the UE is to skip PDCCH monitoring during either (1) the period of time between the PDCCH and the PDSCH and the period of time between the PDSCH and the PUCCH (for example, when the one bit indication is set to a value of 0), or (2) the period of time between the PDCCH and the PUSCH (for example, when the one bit indication is set to a value of 1).

As a more particular example, a UE configured with a discontinuous reception (DRX) mode of operation can receive, in a PDCCH, a wake-up indication bit. A '0' value for the wake-up indication bit may cause the UE to not start (that is, refrain from starting) an on-duration timer for a next long DRX cycle, while a '1' value for the wake-up indication bit indicates that the UE is to start the on-duration timer for the next long DRX cycle. Therefore, the one-bit wake-up indication bit can act as an indication to skip PDCCH monitoring PDCCH monitoring for a particular time period.

In some aspects, the indication is a two bit indication and, therefore, may be carried in two bits in the PDCCH. As an example, the first physical channel scheduled by the PDCCH may be a PDSCH, the second physical channel scheduled by the PDCCH may be a PUCCH, and the third physical channel scheduled by the PDCCH may be a PUSCH. Here, the two bit indication may indicate that the UE is to skip PDCCH monitoring during one of: (1) the period of time between the PDCCH and the PDSCH (for example, when the two bit indication is set to a value of 0), (2) the period of time between the PDSCH and the PUCCH (for example, when the two bit indication is set to a value of 1), (3) the period of time between the PDCCH and the PUSCH (for example, when the two bit indication is set to a value of 2), or (4) the period of time between the PDCCH and the PDSCH, the period of time between the PDSCH and the PUCCH, and the period of time between the PDCCH and the PUSCH (for example, when the two bit indication is set to a value of 3).

In some aspects, using the indication described above (for example, the one bit indication or the two bit indication) incurs a minimal signaling overhead while enabling a dynamic PDCCH skipping indication (using an existing DCI format). In some aspects, the UE may resume PDCCH monitoring after the reception or transmission of a physical channel (for example, the PDSCH, the PUCCH, or the PUSCH).

As a particular example of utilizing the dynamic PDCCH skipping described herein, when cross-slot scheduling is enabled at the UE (for example, when the k0 parameter is greater than 0), there may be a gap between decoding of the PDCCH and reception of the PDSCH scheduled by the PDCCH. This gap is preserved when there is no successive cross-slot scheduling (staggered) between the PDCCH and the PDSCH (which is likely when cross-slot scheduling is enabled). Further, when the k1 parameter is greater than 0, there may be a significant gap between the PDSCH and the PUCCH (for example, to be used for carrying an acknowledgment (ACK) or negative acknowledgment (NACK) of a communication included in the PDSCH). FIG. 5B is a diagram illustrating an example of this situation. In this case, the base station may determine, and may indicate to the UE (for example, using a one bit indication or a two bit indication), that the UE is to skip PDCCH monitoring for a period of time between the PDCCH and the PDSCH scheduled by the PDCCH and a period of time between the PDSCH and the PUCCH scheduled by the PDCCH. The UE may receive the indication in the PDCCH and skip PDCCH monitoring during these periods of time, accordingly.

As another particular example of utilizing the dynamic PDCCH skipping described herein, when the k2 parameter is greater than 0, there may be a significant gap between the PDCCH and the PUSCH scheduled by the PDCCH. FIG. 5C is a diagram illustrating an example of this situation. In this case, the base station may determine, and may indicate to the UE (for example, using a one bit indication or a two bit indication), that the UE is to skip PDCCH monitoring for a period of time between the PDCCH and the PUSCH. The UE may receive the indication in the PDCCH and skip PDCCH monitoring during the period of time, accordingly.

Figure 6:
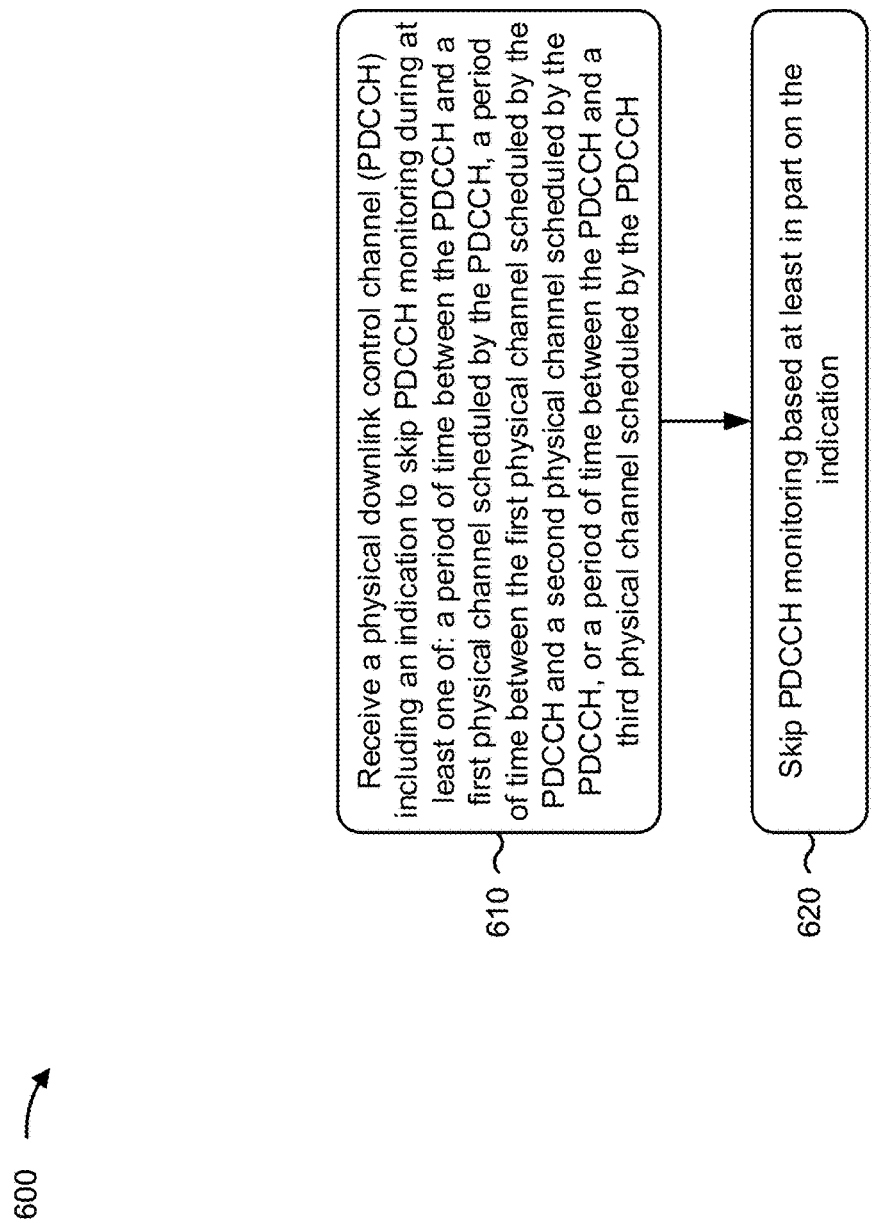
FIG. 6 is a diagram illustrating an example process performed by a UE in accordance with various aspects of the present disclosure.

FIG. 6 is a diagram illustrating an example process 600 performed, for example, by a UE, in accordance with various aspects of the present disclosure. The example process of FIG. 6 is an example where the UE (for example, UE 120) performs operations associated with a dynamic PDCCH skipping indication.

As shown in FIG. 6, in some aspects, the example process may include receiving a PDCCH including an indication to skip PDCCH monitoring during at least one of: a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH (block 610). For example, the UE (for example, using receive processor 258, controller/processor 280, memory 282, among other possibilities) may receive a PDCCH including an indication to skip PDCCH monitoring during at least one of: a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, as described above.

As further shown in FIG. 6, in some aspects, the example process may include skipping PDCCH monitoring based at least in part on the indication (block 620). For example, the UE (for example, using receive processor 258, controller/processor 280, memory 282, among other possibilities) may skip PDCCH monitoring based at least in part on the indication, as described above.

The example process of FIG. 6 may include additional aspects, such as any single aspect or any combination of aspects described below and/or in connection with one or more other processes described elsewhere herein.

In a first additional aspect, the indication is carried in DCI included in the PDCCH.

In a second additional aspect, alone or in combination with the first aspect, the first physical channel scheduled by the PDCCH is a PDSCH.

In a third additional aspect, alone or in combination with one or more of the first and second aspects, the first physical channel scheduled by the PDCCH is a PDSCH and the second physical channel scheduled by the PDCCH is a PUCCH.

In a fourth additional aspect, alone or in combination with one or more of the first through third aspects, the third physical channel scheduled by the PDCCH is a PUSCH.

In a fifth additional aspect, alone or in combination with one or more of the first through fourth aspects, the indication is a one bit indication carried in a single bit of the PDCCH.

In a sixth additional aspect, in combination with the fifth aspect, the first physical channel is a PDSCH, the second physical channel is a PUCCH, and the third physical channel is a PUSCH, and the one bit indication indicates that the UE is to skip PDCCH monitoring during either: the period of time between the PDCCH and the PDSCH and the period of time between the PDSCH and the PUCCH, or the period of time between the PDCCH and the PUSCH.

In a seventh additional aspect, alone or in combination with one or more of the first through fourth aspects, the indication is a two bit indication carried in two bits of the PDCCH.

In an eighth additional aspect, in combination with the seventh aspect, the first physical channel is a PDSCH, the second physical channel is a PUCCH, and the third physical channel is a PUSCH, and the two bit indication indicates that the UE is to skip PDCCH monitoring during one of: the period of time between the PDCCH and the PDSCH, the period of time between the PDSCH and the PUCCH, the period of time between the PDCCH and the PUSCH, or the period of time between the PDCCH and the PDSCH, the period of time between the PDSCH and the PUCCH, and the period of time between the PDCCH and the PUSCH.

Figure 7:
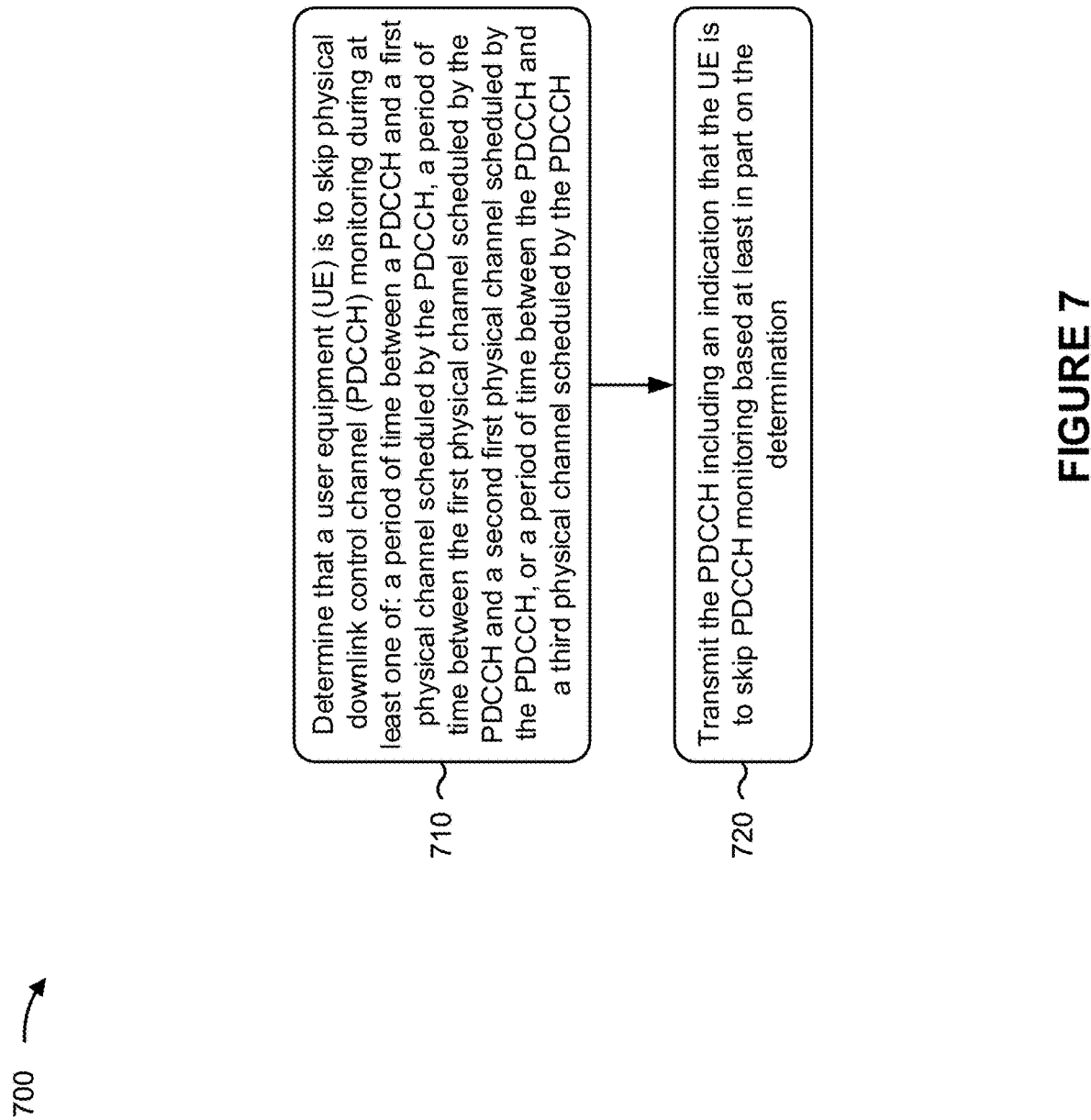
FIG. 7 is a diagram illustrating an example process performed by a base station in accordance with various aspects of the present disclosure.

FIG. 7 is a diagram illustrating an example process 700 performed, for example, by a base station, in accordance with various aspects of the present disclosure. The example process of FIG. 7 is an example where the base station (for example, base station 110) performs operations associated with a dynamic PDCCH skipping indication.

As shown in FIG. 7, in some aspects, the example process may include determining that a UE is to skip PDCCH monitoring during at least one of: a period of time between a PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH (block 710). For example, the base station (for example, using transmit processor 220, receive processor 238, controller/processor 240, memory 242, among other possibilities) may determine that a user UE (for example, a UE 120) is to skip PDCCH monitoring during at least one of: a period of time between a PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH, as described above.

As further shown in FIG. 7, in some aspects, the example process may include transmitting the PDCCH including an indication that the UE is to skip PDCCH monitoring based at least in part on the determination (block 720). For example, the base station (for example, using transmit processor 220, controller/processor 240, memory 242, among other possibilities) may transmit the PDCCH including an indication that the UE is to skip PDCCH monitoring based at least in part on the determination, as described above.

The example process of FIG. 7 may include additional aspects, such as any single aspect or any combination of aspects described below and/or in connection with one or more other processes described elsewhere herein.

In a first additional aspect, the indication is carried in DCI included in the PDCCH.

In a second additional aspect, alone or in combination with the first aspect, the first physical channel scheduled by the PDCCH is a PDSCH.

In a third additional aspect, alone or in combination with one or more of the first and second aspects, the first physical channel scheduled by the PDCCH is a PDSCH and the second physical channel scheduled by the PDCCH is a PUCCH.

In a fourth additional aspect, alone or in combination with one or more of the first through third aspects, the third physical channel scheduled by the PDCCH is a PUSCH.

In a fifth additional aspect, alone or in combination with one or more of the first through fourth aspects, the indication is a one bit indication carried in a single bit of the PDCCH.

In a sixth additional aspect, in combination with the fifth aspect, the first physical channel is a PDSCH, the second physical channel is a PUCCH, and the third physical channel is a PUSCH, and the one bit indication indicates that the UE is to skip PDCCH monitoring during either: the period of time between the PDCCH and the PDSCH and the period of time between the PDSCH and the PUCCH, or the period of time between the PDCCH and the PUSCH.

In a seventh additional aspect, alone or in combination with one or more of the first through fourth aspects, the indication is a two bit indication carried in two bits of the PDCCH.

In an eighth additional aspect, in combination with the seventh aspect, the first physical channel is a PDSCH, the second physical channel is a PUCCH, and the third physical channel is a PUSCH, and the two bit indication indicates that the UE is to skip PDCCH monitoring during one of: the period of time between the PDCCH and the PDSCH, the period of time between the PDSCH and the PUCCH, the period of time between the PDCCH and the PUSCH, or the period of time between the PDCCH and the PDSCH, the period of time between the PDSCH and the PUCCH, and the period of time between the PDCCH and the PUSCH.

Figure 8:
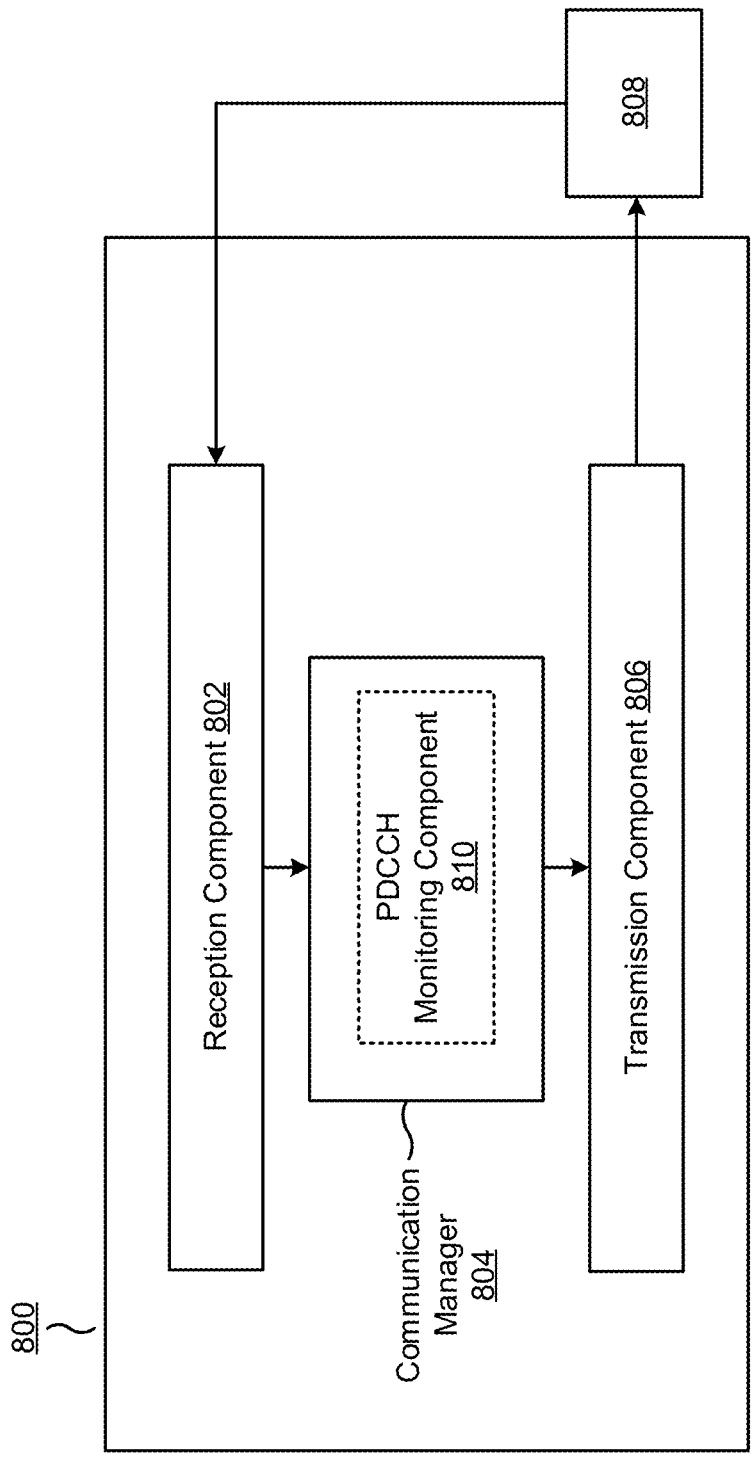
FIGS. 8 and 9 are block diagrams of example apparatuses for wireless communication in accordance with various aspects of the present disclosure.

FIG. 8 is a block diagram of an example apparatus 800 for wireless communication in accordance with various aspects of the present disclosure. The apparatus 800 may be a UE, or a UE may include the apparatus 800. In some aspects, the apparatus 800 includes a reception component 802, a communication manager 804, and a transmission component

806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein in connection with FIGS. 5A-5C. Additionally or alternatively, the apparatus 800 may be configured to perform one or more processes described herein, such as process 600 of FIG. 6. In some aspects, the apparatus 800 may include one or more components of the UE described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the UE described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the UE described above in connection with FIG. 2. In some aspects, the transmission component 806 may be co-located with the reception component 802 in a transceiver.

In some aspects, the communication manager 804 may receive or may cause the reception component 802 to receive a PDCCH including an indication to skip PDCCH monitoring during at least one of a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH. In some aspects, the communication manager 804 may skip PDCCH monitoring based at least in part on the indication. In some aspects, the communication manager 804 may include a controller/processor, a memory, or a combination thereof, of the UE described above in connection with FIG. 2.

In some aspects, the communication manager 804 may include a set of components, such as a PDCCH monitoring component 810. Alternatively, the set of components may be separate and distinct from the communication manager 804. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 802 may receive a PDCCH including an indication to skip PDCCH monitoring during at least one of a period of time between the PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH. In some aspects, the PDCCH monitoring component 810 may skip PDCCH monitoring based at least in part on the indication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
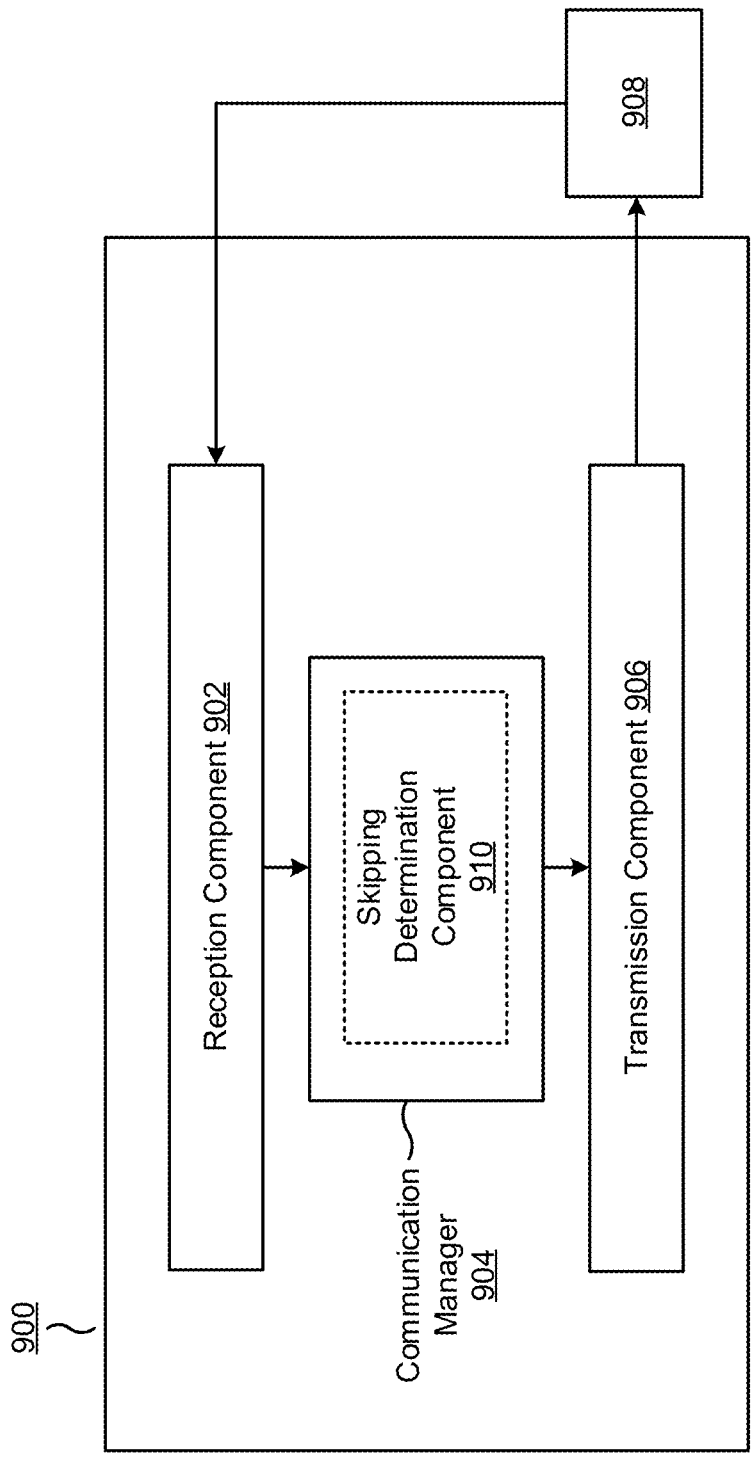

FIG. 9 is a block diagram of an example apparatus 900 for wireless communication in accordance with various aspects of the present disclosure. The apparatus 900 may be a base station, or a base station may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 5A-5C. Additionally or alternatively, the apparatus 900 may be configured to perform one or more processes described herein, such as process 700 of FIG. 7. In some aspects, the apparatus 900 may include one or more components of the base station described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-todigital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the base station described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the base station described above in connection with FIG. 2. In some aspects, the transmission component 906 may be co-located with the reception component 902 in a transceiver.

In some aspects, the communication manager 904 may determine that a UE is to skip PDCCH monitoring during at least one of: a period of time between a PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH. In some aspects, the communication manager 904 may transmit or may cause the transmission component 906 to transmit the PDCCH including an indication that the UE is to skip PDCCH monitoring based at least in part on the determination. In some aspects, the communication manager 904 may include a controller/processor, a memory, a scheduler, a communication unit, or a combination thereof, of the base station described above in connection with FIG. 2.

In some aspects, the communication manager 904 may include a set of components, such as a skipping determination component 910. Alternatively, the set of components may be separate and distinct from the communication manager 904. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the skipping determination component 910 may determine that a UE is to skip PDCCH monitoring during at least one of: a period of time between a PDCCH and a first physical channel scheduled by the PDCCH, a period of time between the first physical channel scheduled by the PDCCH and a second physical channel scheduled by the PDCCH, or a period of time between the PDCCH and a third physical channel scheduled by the PDCCH. In some aspects, the transmission component 906 to transmit the PDCCH including an indication that the UE is to skip PDCCH monitoring based at least in part on the determination.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a physical downlink control channel (PDCCH) including an indication to skip PDCCH monitoring during at least one of:
      a first period of time between the PDCCH and a first physical channel scheduled by the PDCCH,
      a second period of time between the first physical channel scheduled by the PDCCH and a second physical channel scheduled by the PDCCH, or
      a third period of time between the PDCCH and a third physical channel scheduled by the PDCCH,
   wherein the indication is a one bit indication carried in a single bit of the PDCCH or a two bit indication carried in two bits of the PDCCH, and
   wherein:
      based on the indication being the one bit indication and the one bit indication being set to a first value, the one bit indication indicates that the UE is to skip PDCCH monitoring during the first period of time and the second period of time,
      based on the indication being the one bit indication and the one bit indication being set to a second value, the one bit indication indicates that the UE is to skip PDCCH monitoring during the third period of time,
      based on the indication being the two bit indication and the two bit indication being set to the first value, the two bit indication indicates that the UE is to skip PDCCH monitoring during the first period of time,
      based on the indication being the two bit indication and the two bit indication being set to the second value, the two bit indication indicates that the UE is to skip PDCCH monitoring during the second period of time,
      based on the indication being the two bit indication and the two bit indication being set to a third value, the two bit indication indicates that the UE is to skip PDCCH monitoring during the third period of time, or
      based on the indication being the two bit indication and the two bit indication being set to a fourth value, the two bit indication indicates that the UE is to skip PDCCH monitoring during the first period of time, the second period of time, and the third period of time; and
   skipping PDCCH monitoring based at least in part on the indication.

2. The method of claim 1, wherein the indication is carried in downlink control information (DCI) included in the PDCCH.

3. The method of claim 1, wherein the first physical channel scheduled by the PDCCH is a physical downlink shared channel (PDSCH).

4. The method of claim 1, wherein the first physical channel scheduled by the PDCCH is a physical downlink shared channel (PDSCH) and the second physical channel scheduled by the PDCCH is a physical uplink control channel (PUCCH).

5. The method of claim 1, wherein the third physical channel scheduled by the PDCCH is a physical uplink shared channel (PUSCH).

6. A method of wireless communication performed by a base station, comprising:
   determining that a user equipment (UE) is to skip physical downlink control channel (PDCCH) monitoring during at least one of:
      a first period of time between a PDCCH and a first physical channel scheduled by the PDCCH,
      a second period of time between the first physical channel scheduled by the PDCCH and a second physical channel scheduled by the PDCCH, or
      a third period of time between the PDCCH and a third physical channel scheduled by the PDCCH; and
   transmitting the PDCCH including an indication that the UE is to skip PDCCH monitoring based at least in part on the determination,
   wherein the indication is a one bit indication carried in a single bit of the PDCCH or a two bit indication carried in two bits of the PDCCH, and
   wherein:
      based on the indication being the one bit indication and the one bit indication being set to a first value, the one bit indication indicates that the UE is to skip PDCCH monitoring during the first period of time and the second period of time,
      based on the indication being the one bit indication and the one bit indication being set to a second value, the one bit indication indicates that the UE is to skip PDCCH monitoring during the third period of time,
      based on the indication being the two bit indication and the two bit indication being set to the first value, the two bit indication indicates that the UE is to skip PDCCH monitoring during the first period of time,
      based on the indication being the two bit indication and the two bit indication being set to the second value, the two bit indication indicates that the UE is to skip PDCCH monitoring during the second period of time,
      based on the indication being the two bit indication and the two bit indication being set to a third value, the two bit indication indicates that the UE is to skip PDCCH monitoring during the third period of time, or
      based on the indication being the two bit indication and the two bit indication being set to a fourth value, the two bit indication indicates that the UE is to skip PDCCH monitoring during the first period of time, the second period of time, and the third period of time.

7. The method of claim 6, wherein the indication is carried in downlink control information (DCI) included in the PDCCH.

8. The method of claim 6, wherein the first physical channel scheduled by the PDCCH is a physical downlink shared channel (PDSCH).

9. The method of claim 6, wherein the first physical channel scheduled by the PDCCH is a physical downlink shared channel (PDSCH) and the second physical channel scheduled by the PDCCH is a physical uplink control channel (PUCCH).

10. The method of claim 6, wherein the third physical channel scheduled by the PDCCH is a physical uplink shared channel (PUSCH).

11. A user equipment (UE) for wireless communication, comprising:
a memory; and
one or more processors coupled to the memory, the one or more processors configured to:
receive a physical downlink control channel (PDCCH) including an indication to skip PDCCH monitoring during at least one of:
a first period of time between the PDCCH and a first physical channel scheduled by the PDCCH,
a second period of time between the first physical channel scheduled by the PDCCH and a second physical channel scheduled by the PDCCH, or
a third period of time between the PDCCH and a third physical channel scheduled by the PDCCH,
wherein the indication is a one bit indication carried in a single bit of the PDCCH or a two bit indication carried in two bits of the PDCCH, and
wherein:
based on the indication being the one bit indication and the one bit indication being set to a first value, the one bit indication indicates that the UE is to skip PDCCH monitoring during the first period of time and the second period of time,
based on the indication being the one bit indication and the one bit indication being set to a second value, the one bit indication indicates that the UE is to skip PDCCH monitoring during the third period of time,
based on the indication being the two bit indication and the two bit indication being set to the first value, the two bit indication indicates that the UE is to skip PDCCH monitoring during the first period of time,
based on the indication being the two bit indication and the two bit indication being set to the second value, the two bit indication indicates that the UE is to skip PDCCH monitoring during the second period of time,
based on the indication being the two bit indication and the two bit indication being set to a third value, the two bit indication indicates that the UE is to skip PDCCH monitoring during the third period of time, or
based on the indication being the two bit indication and the two bit indication being set to a fourth value, the two bit indication indicates that the UE is to skip PDCCH monitoring during the first period of time, the second period of time, and the third period of time; and
skip PDCCH monitoring based at least in part on the indication.

12. The UE of claim 11, wherein the indication is carried in downlink control information (DCI) included in the PDCCH.

13. The UE of claim 11, wherein the first physical channel scheduled by the PDCCH is a physical downlink shared channel (PDSCH).

14. The UE of claim 11, wherein the first physical channel scheduled by the PDCCH is a physical downlink shared channel (PDSCH) and the second physical channel scheduled by the PDCCH is a physical uplink control channel (PUCCH).

15. The UE of claim 11, wherein the third physical channel scheduled by the PDCCH is a physical uplink shared channel (PUSCH).

16. A base station for wireless communication, comprising:
a memory; and
one or more processors coupled to the memory, the one or more processors configured to:
determine that a user equipment (UE) is to skip physical downlink control channel (PDCCH) monitoring during at least one of:
a first period of time between a PDCCH and a first physical channel scheduled by the PDCCH,
a second period of time between the first physical channel scheduled by the PDCCH and a second physical channel scheduled by the PDCCH, or
a third period of time between the PDCCH and a third physical channel scheduled by the PDCCH; and
transmit the PDCCH including an indication that the UE is to skip PDCCH monitoring based at least in part on the determination,
wherein the indication is a one bit indication carried in a single bit of the PDCCH or a two bit indication carried in two bits of the PDCCH, and
wherein:
based on the indication being the one bit indication and the one bit indication being set to a first value, the one bit indication indicates that the UE is to skip PDCCH monitoring during the first period of time and the second period of time,
based on the indication being the one bit indication and the one bit indication being set to a second value, the one bit indication indicates that the UE is to skip PDCCH monitoring during the third period of time,
based on the indication being the two bit indication and the two bit indication being set to the first value, the two bit indication indicates that the UE is to skip PDCCH monitoring during the first period of time,
based on the indication being the two bit indication and the two bit indication being set to the second value, the two bit indication indicates that the UE is to skip PDCCH monitoring during the second period of time,
based on the indication being the two bit indication and the two bit indication being set to a third value, the two bit indication indicates that the UE is to skip PDCCH monitoring during the third period of time, or
based on the indication being the two bit indication and the two bit indication being set to a fourth value, the two bit indication indicates that the UE is to skip PDCCH monitoring during the first period of time, the second period of time, and the third period of time.

17. The base station of claim 16, wherein the indication is carried in downlink control information (DCI) included in the PDCCH.

18. The base station of claim 16, wherein the first physical channel scheduled by the PDCCH is a physical downlink shared channel (PDSCH).

19. The base station of claim 16, wherein the first physical channel scheduled by the PDCCH is a physical downlink shared channel (PDSCH) and the second physical channel scheduled by the PDCCH is a physical uplink control channel (PUCCH).

20. The base station of claim 16, wherein the third physical channel scheduled by the PDCCH is a physical uplink shared channel (PUSCH).

21. The method of claim 1, wherein the UE is enabled for cross-slot scheduling.

22. The method of claim 4, wherein the PUCCH is to be used for carrying an acknowledgment (ACK) or negative acknowledgment (NACK) of a communication included in the PDSCH.

23. The method of claim 1, further comprising:
receiving, in the PDCCH, a wake-up indication bit; and
selectively starting an on-duration timer for a next long discontinuous reception (DRX) cycle based on a value of the wake-up indication bit.

24. The method of claim 6, wherein determining that the UE is to skip PDCCH monitoring comprises:
determining that the UE is to skip PDCCH monitoring based on scheduling physical channels to be used for transmitting a communication to the UE.

25. The method of claim 6, wherein determining that the UE is to skip PDCCH monitoring comprises:
determining that the UE is to skip PDCCH monitoring based on receiving a communication from the UE.

26. The method of claim 6, wherein determining that the UE is to skip PDCCH monitoring comprises:
determining that the UE is to skip PDCCH monitoring based on information associated with cross-slot scheduling.

27. The UE of claim 11, wherein the UE is enabled for cross-slot scheduling.

28. The UE of claim 14, wherein the PUCCH is to be used for carrying an acknowledgment (ACK) or negative acknowledgment (NACK) of a communication included in the PDSCH.

29. The UE of claim 11, wherein the one or more processors are further configured to:
receive, in the PDCCH, a wake-up indication bit; and
selectively start an on-duration timer for a next long discontinuous reception (DRX) cycle based on a value of the wake-up indication bit.

* * * * *